United States Patent [19]

Rop et al.

[11] Patent Number: 4,610,742
[45] Date of Patent: Sep. 9, 1986

[54] METHODS AND MATERIALS FOR SPLICING TUBULAR FOOD CASINGS

[75] Inventors: Jaap Rop, BK Delfzijl; Jacobus H. A. Verboekend, BE Appingedam, both of Netherlands

[73] Assignee: Teepak, Inc., Oak Brook, Ill.

[21] Appl. No.: 672,566

[22] Filed: Nov. 15, 1984

[51] Int. Cl.⁴ .................... B65D 81/34; B65H 69/08
[52] U.S. Cl. .................... 156/158; 138/118.1; 138/120; 156/294; 156/304.2; 156/304.3; 156/304.6; 426/105; 428/36
[58] Field of Search .................. 156/158, 304.3, 304.2, 156/304.6, 503, 294, 423; 17/49; 138/118.1, 120; 426/105, 138; 428/36

[56] References Cited

U.S. PATENT DOCUMENTS

| | | | |
|---|---|---|---|
| 2,608,488 | 8/1952 | Rumsey | 99/176 |
| 2,631,509 | 3/1953 | Whytlaw | 93/94 |
| 2,961,323 | 11/1960 | Underwood et al. | 99/176 |
| 3,560,223 | 2/1971 | Turbak | 99/109 |
| 3,597,791 | 8/1971 | Marbach et al. | 17/49 |
| 3,669,692 | 6/1972 | Turbak | 99/176 |
| 3,794,515 | 2/1974 | Turbak et al. | 117/145 |
| 4,032,176 | 6/1977 | Tabary | 285/18 |
| 4,396,039 | 8/1983 | Klenk et al. | 138/118.1 |
| 4,401,135 | 8/1983 | Andrä et al. | 138/118.1 |

Primary Examiner—Michael Wityshyn
Attorney, Agent, or Firm—Howard M. Ellis; Michael L. Dunn

[57] ABSTRACT

The tubular food casings and especially wet sausage casings are spliced together by means of splicing tape comprising cellulose backing coated with a saran polymer. The tape and joined casing sections are bonded by application of controlled heat and pressure to form machinable and stuffable splices with exceptionally high peel strengths when wet.

14 Claims, 9 Drawing Figures

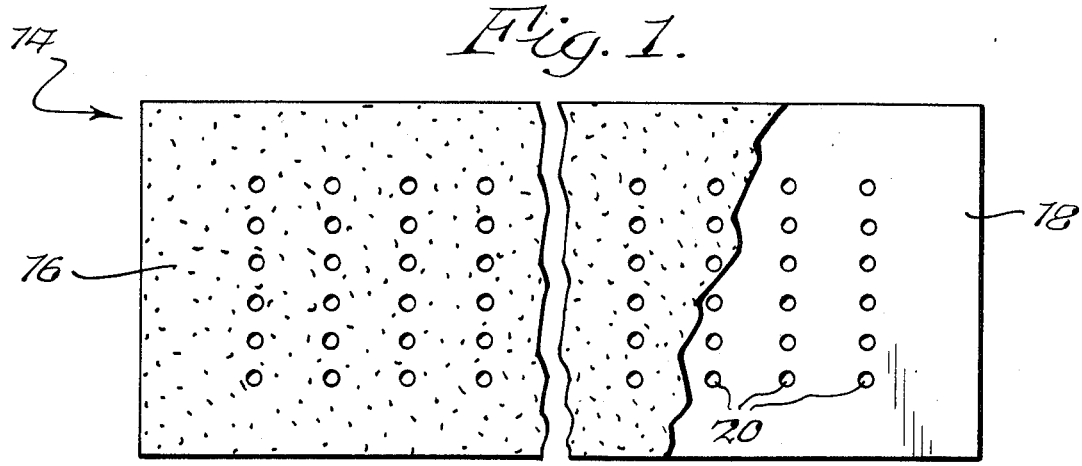
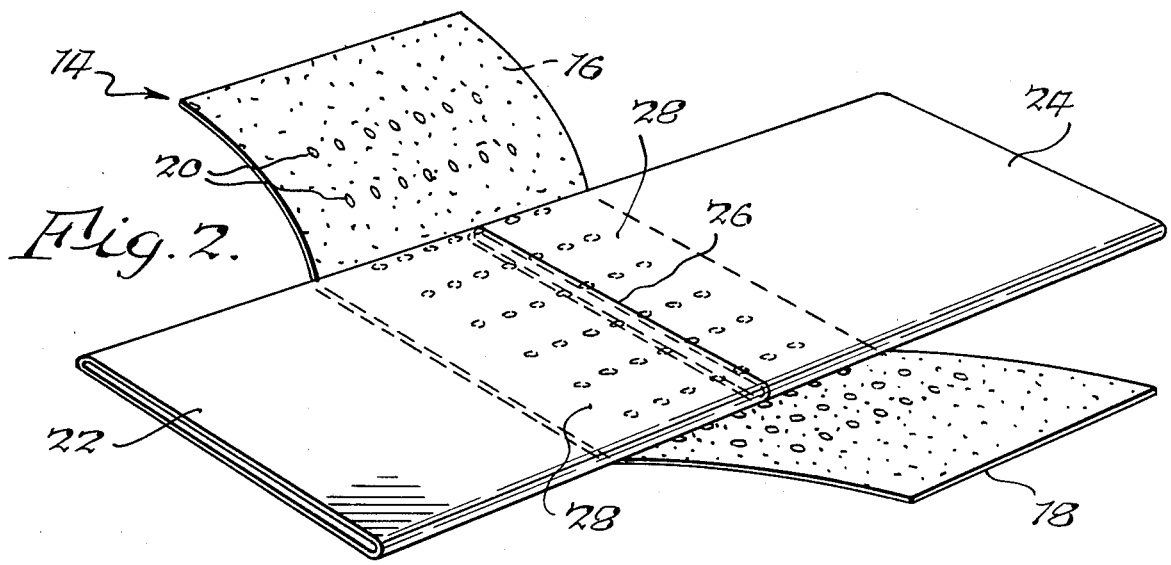
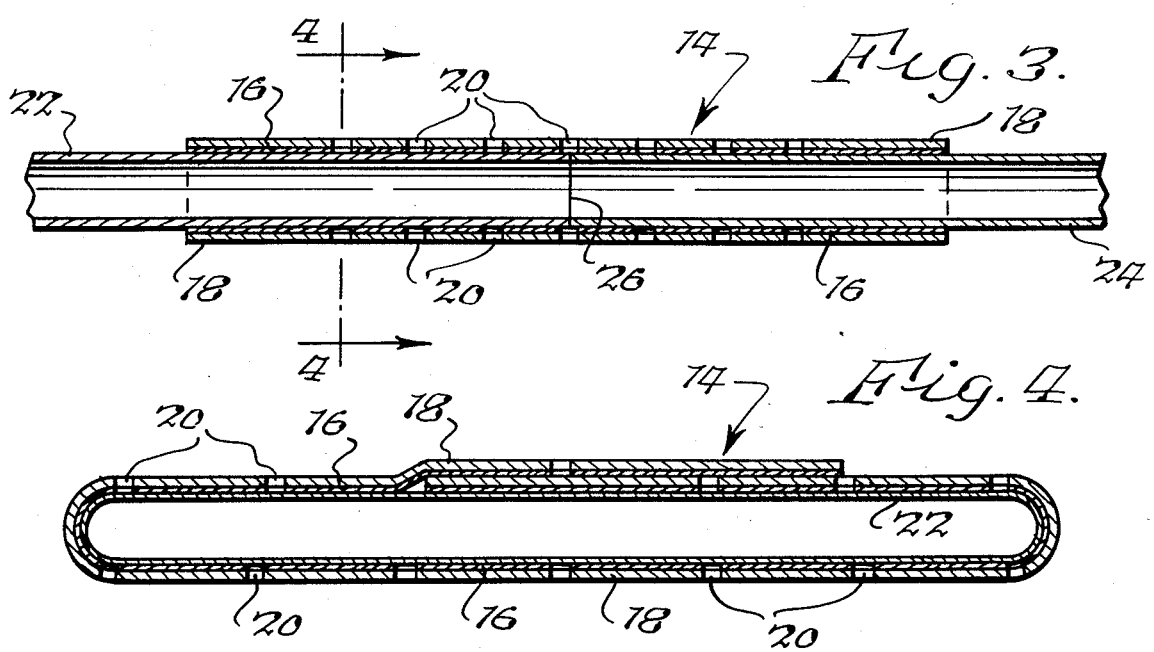

METHODS AND MATERIALS FOR SPLICING TUBULAR FOOD CASINGS

BACKGROUND OF THE INVENTION

The present invention relates to methods and materials for joining sections of flexible tubing together to form continuous lengths for various applications, especially, for example, casings for packaging food products like sausages, meats, cheeses and the like.

Tubular food casings, and more particularly, sausage casings like those made of regenerated cellulose and collagen have been widely used in processing frankfurters, bolognas, salamis, hams, etc. Tubular casings of various lengths are manufactured, for instance, by extruding viscose into a fibrous web which is then regenerated in a coagulating bath. The regenerated tubular material is washed to remove by-products, further treated and rolled flat onto large reels. In some instances, the casing is dried and shirred into tubular strands, or alternatively, left unshirred with sufficient water, placticizer, etc., such that further soaking need not be performed prior to stuffing by food processors. In either instance, a casing reel may contain several lengths of flat reelstock totaling several hundred feet.

The optimum length of continuous casing will vary depending on the particular apparatus, e.g. shirring, filling, employed. In general however, short lengths of casing will be inefficient, necessitating frequent stoppages of automated equipment to allow time to thread a new section of casing through the apparatus. For this reason, it has been found highly desirable to join or splice the end of one tubular casing to the beginning of a new section of tubular casing before the end of the first section begins its passage through the apparatus. The end portion of first section will then serve to pull the first section of the newly spliced section through the apparatus. In this manner, the need for frequent rethreading of the apparatus and restoring the cycle after each short length of casing material is run through can be avoided.

Various methods and materials have been proposed for splicing tubular casings. For example, U.S. Pat. No. 4,032,176 discloses several methods for assembling lengths of tubular casings end-to-end using pressure sensitive adhesive strips. It has been found, however, that unless splices are bonded with strips which are sealed with appropriate heat and pressure the frequency of joint separation can increase significantly, especially with casings having high moisture levels. Pressure sensitive adhesives do not form fully cured bonds, but instead, remain tacky. Consequently, such joints are not completely reliable, particularly since they must be machinable, remain intact when wet and be able to withstand the forces generated by stuffing equipment.

U.S. Pat. No. 2,631,509 discloses a method of making tubular articles from a continuous sheet which is drawn through a tube forming guide. As the tube is formed a lapped edge is made and a bead of thermoplastic material simultaneously deposited therebetween. The edge is sealed under heat and pressure. U.S. Pat. Nos. 3,560,223 and 3,669,692 disclose the fabrication of tubular articles from flat reelstock. The latter patents, however, relate specifically to casings for liver sausage, and therefore, have surfaces coated with saran polymer. In each of the immediate foregoing patents, the edges of the tubes are sealed without splicing tape. That is, the heat sealed joints of the prior art casings are bonded with an adhesive only which is non-supportive. The absence of a backing for the adhesive diminishes the machinability of the bonded joint especially when wet, and therefore, overall reliability is also diminished. Accordingly, there is a need for improved methods and materials for splicing tubular food casings together, and particularly, for the newer premoisturized casings prepared by manufacturers in ready-to-stuff condition with at least about 20% moisture content based on total casing weight. They would include premoisturized casings, for instance, even to gel state water content.

SUMMARY OF THE INVENTION

It has now been found that improved splices can be used to prepare continuous lengths of tubular food casings. The lengths of casings bonded end-to-end are prepared with novel splicing tape comprising a cellulose substrate with a saran polymer adhesive. Thus, the present invention contemplates splicing tapes which provide both adhesive and backing material all-in-one.

Splicing according to the present invention is carried out by the steps of assembling the trailing end of a first casing and the leading end of a second casing to form a joint. The joint is then contacted with the splicing tape and bonded by compressing and heating to a temperature sufficient to soften or melt the saran polymer without causing it to degrade. The pressure forces the softened polymer into intimate contact with the surfaces of the casaings being spliced. Hence, the saran polymer coated cellulosic splicing tape provides low bulk, high shear and high shock strength splices for food casings. When fully bonded, the splices exhibit superior peel strength and can be used to splice virtually all casings, including dried casings. However, because the bonds are also water impervious the splicing tape and methods of use are especially well suited for splicing wet or premoisturized, ready-to-stuff type casings. The splices are shirrable and stuffable, and because they are low bulk are also machinable.

BRIEF DESCRIPTION OF THE DRAWINGS

For a further understanding of the invention as well as its characterizing features, reference should now be made to the following detailed description thereof taken in conjunctin with the accompanying drawings, wherein:

FIG. 1 is a top view of a strip of splicing tape according to the present invention shown with enlarged perforations;

FIG. 2 is a perspective view of casing segments arranged in abutting relation partially wrapped with the splicing tape of FIG. 1;

FIG. 3 is a longitudinal cross-sectional view of the finished splice of FIG. 2;

FIG. 4 is a transverse cross-sectional view of the splice taken along line 4—4 of FIG. 3;

DESCRIPTION OF THE PREFERRED EMBODIMENTS

Figure 5:
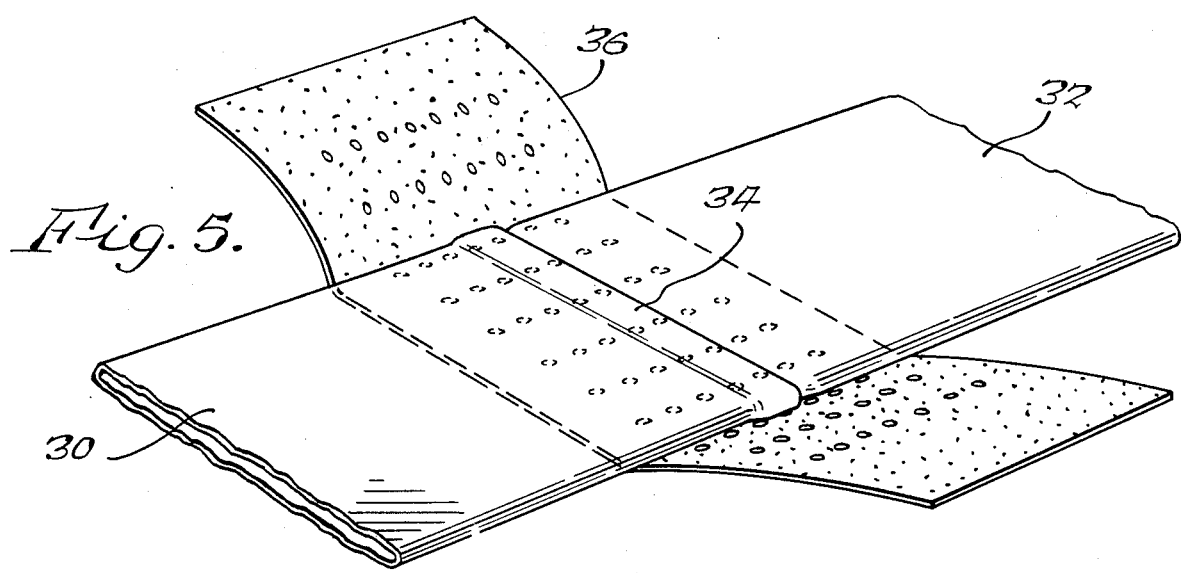
FIG. 5 is a perspective view of a partially wrapped joint where the end of one segment is telescoped inside the other.

Turning now to FIG. 1, there is provided a strip of splicing tape 14 having an outer saran polymer coating 16 on at least one surface thereof. The tape is comprised of a backing 18 formed of a cellulose film, which would include, for example, regenerated cellulose, cellophane, rayon and other such manufactured polymers. Regenerated cellulose is intended to include both clear, regenerated cellulose films and films of fibrous reinforced regenerated cellulose. The principal criteria in selecting a specific cellulose backing material is that it have a higher melting or scorching temperature than the melting point of the outer saran polymer coating.

The cellulose backing may be prepared by any of the well known methods in the art, including the viscose process, cuprammonium process, by denitration of cellulose nitrate, and the like. For example, clear regenerated cellulose films can be prepared by extruding viscose into a coagulating bath containing ammonium sulfate, sodium sulfate and sulfuric acic. The regenerated cellulose is removed from the coagulating bath and washed to remove reactants and by-products. In the case of the stronger fibrous reinforced regenerated films the manufacturing process is modified to insert a web preferably, for example, a long fiber hemp paper into the film. A fibrous web is passed through a coating die where viscose is extruded into the web followed by treatment in a coagulating bath where the cellulose is regenerated to produce a paper-reinforced film typically containing from about 35 to about 40% paper and from about 60 to about 65% regenerated cellulose and plasticizing ingredients e.g. glycerin and water.

In preparing the splicing tape, a thin preferably continuous coating of a saran polymer is applied to at least one surface of the backing material. The expressions—saran polymer and saran adhesive—as used herein are intended to include a family of known thermoplastic resins, viz vinylidene chloride homopolymer and copolymers of vinylidene chloride with at leasat one other monomer, such as vinyl chloride, acrylonitrile, acrylates, methacrylates and their lower alkyl esters e.g. . . methyl, ethyl; vinyl acetate, etc. Copolymers of vinylidene chloride with other monomers are generally described in terms of the weight ratio of the monomer units in the copolymer. Saran, preferably has at least about 50 percent vinylidene chloride. However, copolymers containing as little as 10 percent vinylidene chloride are also included within this term in accordance with the present invention.

"Splicing tape" as used herein requires a saran coating having sufficient vinylidene chloride to permit the information of a strong bond with the cellulose backing. The saran adhesive coating may be applied by conventional methods known in the art. The objective in each instance is to prepare a flexible splicing tape with a thin, continuous, adherant coating of the adhesive onto the cellulose backing for optimum peel and shock strength properties, especially when the spliced segments of casing are moistened or wet. For example, saran polymers can be applied directly onto tape backing by the methodology described in U.S. Pat. No. 2,961,323. There, a saran polymer either in an aqueous or nonaqueous system is applied to uncoated cellulose by various techniques, including dipping or by means of a doctor blade, spraying or by extrusion. Good adhesion of the saran is achieved by drying followed by heating at temperatures sufficient to sinter the coating, but at temperatures below those which will adversely affect the cellulose base.

Alternatively, the saran polymer may be applied by means of a self-priming coating composition, such as described in U.S. Pat. No. 3,794,515 where a saran resin, a plasticizer, a polymeric polyisocyanate and an activator are applied from a solvent system. There, tubular cellulose is coated with one-coat lacquer and then cured by heating. As a further alternative, the cellulose substrate may be primed as a seperate step before applying the saran adhesive. For example, after the cellulose has been regenerated, washed, plasticized, etc., and while it is still in the gel state and prior to drying, may be treated with a food acceptable grade adhesion primer for even more tenacious adherence of the saran polymer to the tape backing. One especially preferred primer is an epoxy-substituted resin consisting of a water-soluable thermosetting reaction product of a polysecondary amine. More specifically, they are polymers of epichlorohydrin having a purality of —NH— groups and having an epoxide equivalent weight of at least about 100, and preferrably less than 2000, as determined by reaction with mercapto-ethanol in the procedure described in Bates TAPPI, 52, No. 6, 1969, page 1163. The epoxy-substituted primers especially preferred for use in coating the tape backing are available under the name Kymene, a registered trademark of Hercules Powder Company, Wilmington Del.

Good adhesion properties are obtained when the foregoing primer is applied to the tape backing in minor amounts. Generally, this means the concentration of the primer resin employed is at least 0.5%, and ranges up to 5% or more. The primer resin is cured by heat drying. The saran coating can then be applied to the primed casing, for instance, according to methods disclosed in U.S. Pat. Nos. 3,794,515; 2,961,323, etc.

It is to be understood, the present invention also comtemplates laminated splicing tapes prepared by laminating saran films onto cellulose backings consisting of 1 to 4 inch wide flat, continuous webs of regenerated cellulose. Most preferable, however, the tapes are fabricated from food casing materials having saran polymer coatings where in normal use the casing material provides the needed barrier properties against water loss and oxygen induced discoloration of iron rich meat products, such as liverwurst, hamburger, etc., encased therein. Liverwurst and braunschweiger are commonly packaged in saran coated fibrous casings having controlled moist-vapor permeability. Such casings are frequently supplied as flat reelstock either with an exterior or interior coating of a saran polymer. Splicing tapes can be prepared by severing tubular casings transversely to their longitudinal axes or by slitting the casings longitudinally on one or both edges of flattened reelstock. By slitting a segment of the flattened saran coated tubular material on one edge a suitable splicing tape can be prepared by laying open the material and cutting to suitable lengths depending of the size of the casings being spliced.

Regardless of the method of fabrication, the splicing tape may have plurality of perforations 20 (FIG. 1). Multiple perforations may be formed by various means, such as described in U.S. Pat. No. 2,608,488. Presticking the splicing tape with multiple pinsize holes before using is particularly desirable when the splicing tape is employed in splicing moistened, wet or premoisturized, ready-to-stuff type casings which have sufficient moisture that they need not be soaked further prior to stuffing by meat processors. Such casings usually have at leasat about 20% by weight water based on total casing weight. The perforations allow steam generated from the water in the casing segments to vent when the assembled joint and tape are bonded with heat and pressure. If the steam is allowed to become entrapped the adhesive bonds between the splicing tape and spliced casings can become weakened due to a blistering effect. Therefore, the tapes described herein when used for splicing wet or premoisturized, ready-to-stuff type casaings preferably have multiple perforations.

In using the tape for splicing, generally the trailing end of one casing is brought, for example, into juxtaposition with the leading edge of the next casing and assembled into an appropriate joint. For instance, a three inch wide strip of saran coated splicing tape is wrapped around the assembled joint with the saran coating in contact with the casings being spliced. Preferably, the splicing tape is brought entirely around the joint and the ends lapped. The wrapped joint is then subjected to "programmed" heat and pressure over a period of time whereby the saran polymer at least softens, but more preferably softens and melts into intimate contact with the surfaces of the casings being spliced. When the splice cools and the saran adhesive hardens an extremely strong, water impervious bond results.

In splicing casing segments, the surfaces of the casings in contact with the splicing tape may be treated with an adhesion promoter in the form of a primer coating. Such coatings are frequently used on the exterior surface of cellulose casings to improve, for example, the adhesion of printing inks. similarly, they are often used on the interior surfaces of tubular casings used for liverwurst, braunschweiger, etc., to enhance the adhesion of the meat to the casing, avoiding unappetizing fatty deposits from forming between the interior wall of the casing and the outer surface of the meat product. Such coatings include, for instance, Kymene resins, e.g. . . . Kymene 557 previously described. Other appropriate primers would include food grade polymeric polyisocyanates, such as described in U.S. Pat. No. 3,912,839. Although the surfaces of the spliced casing segments in contact with the splicing tape need not have an adhesion promoter in every instance, the use of an adhesion promoter is especially desirable when the casing segments being spliced are in a moistened or wet condition.

FIGS. 2 and 3 disclose the trailing end of casing segment 22 and the leading end of casing segment 24 with their respective terminal transverse edges in abutting relation 26. The outer surfaces of segments 22 and 24 have a primer coating 28, for example, Kymene resin applied before splicing for stronger bonds after sealing. The splicing tape 14 having a width generally in the range of about 1 to about 4 inches, is first wrapped on the backside of the segments, folded over and then lapped, as best shown in FIG. 4.

Figure 6:
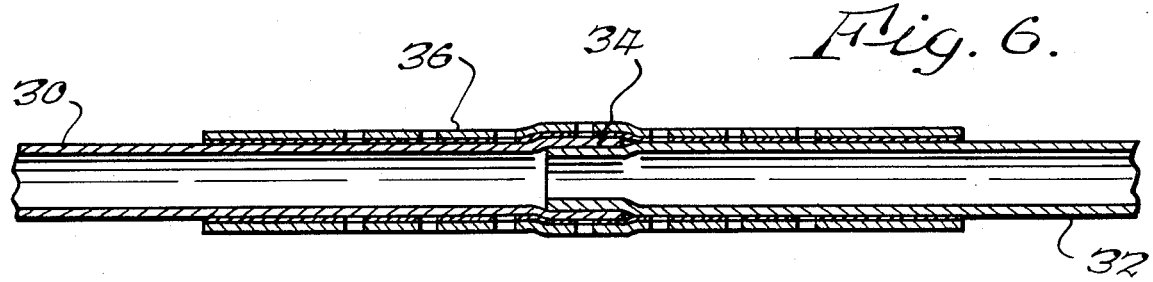
FIG. 6 is a longitudinal cross-sectional view of the finished splice of FIG. 5.

FIGS. 5 and 6 disclose an alternative method of splicing tubular casings where the leading edge of casing segment 32 is telescoped inside the trailing edge of casing segment 30 to form joint 34. Splicing tape 36 of appropriate width and length prepared according to the methods described hereinabove is wrapped around the joint and sealed by the application of heat and pressure.

Bonding the tape to the assembled joint is best accomplished by applying sufficient heat and pressure over a period of time sufficient to soften, and more preferably, melt the saran polymer in the tape without causing it to degrade. It was discovered that if the heating cycle is too long and the saran is exposed to temperatures and pressures sufficient to degrade the polymer hydrochloric acid is liberated. Under such circumstances, the acid rapidly attacks and weakens the splice and spliced material rendering the tubular casing useless for all practical purposes as food wrapping. As the material ages during storage it can be slowly dissolved by the acid. Correspondingly, if too little heat and/or pressure is applied or the heating cycle is too brief to allow the saran to melt the polymer will not make adequate contact with the tubular material to securely bond the casings. Hence, splices of this later type will also be weak and lack the needed peel strength, and may fail.

The duration of the heating cycle and temperatures employed can be ascertained through the exercise of ordinary skill. They are dependent, for instance, on the particular saran polymer employed in the splicing tape, the composition of the casing materials being spliced, as well as the thickness of the casing materials. It will be understood that heating sealing cycles can be shortened by utilizing elevated heat sealer temperatures and pressures without necessarily scorching or degrading the splicing tape. Similarly, cycles can be lengthened provided more moderate temperatures and pressures are utilized. Higher temperatures can be advantageously employed when the casings being spliced are wet or in a moistened, ready-to-stuff condition. The object in each instance is to achieve "goo peel strengths" which for purposes of the present invention are intended to mean delamination of the casing rather than the splicing tape when the tape and casing are pulled at a 90° angle.

Figure 7:
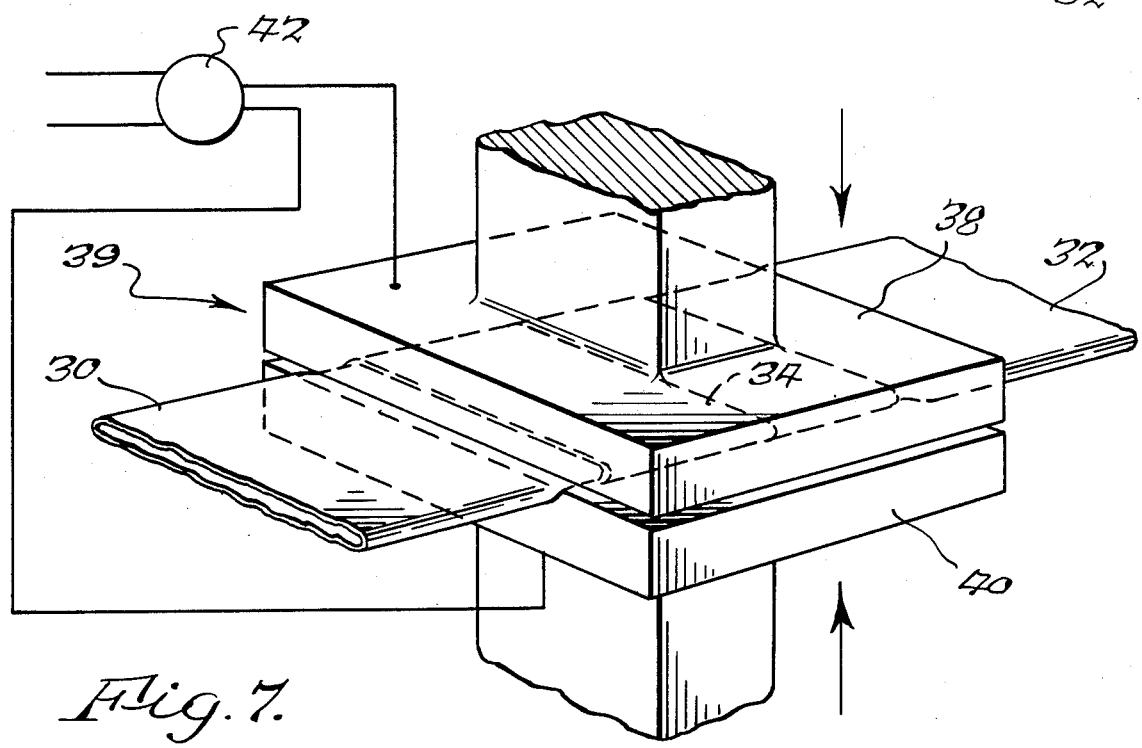
FIG. 7 is a perspective-diagramatic view of spliced casings being bonded with a heat sealer.

FIG. 7 illustrates diagramatically upper heat sealer jaw 38 and lower heat sealer jaw 40 of an electrical heat sealer apparatus 39 of known design applied under pressure, simultaneously to the upper and lower surfaces of joint 34. The temperature of the sealing jaws is regulated by control rheostat 42. Such units are commercially available through ordinary channels of commerce, and include those available from the Vertrod Corporation, Brooklyn, N.Y.

The present invention also contemplates embodiments where the casings being spliced have an outer or inner surface coated with a saran polymer. Tubular food casings having an outer saran coating for controlled moisture-vapor permeability used in packaging liverwurst and braunschweiger, for instance, can be spliced together, for example, by telescoping the end of one segment inside the end of another segment, as illustrated by FIGS. 5 and 6. The outer saran polylmer coating and the inner adhesion primer of such casings even permit splicing the casing segments together without splicing tape. However, the present invention provides for the use of splicing tape previously described with backing for reinforcement and maximum peel strength, especially when wet.

Figure 8:
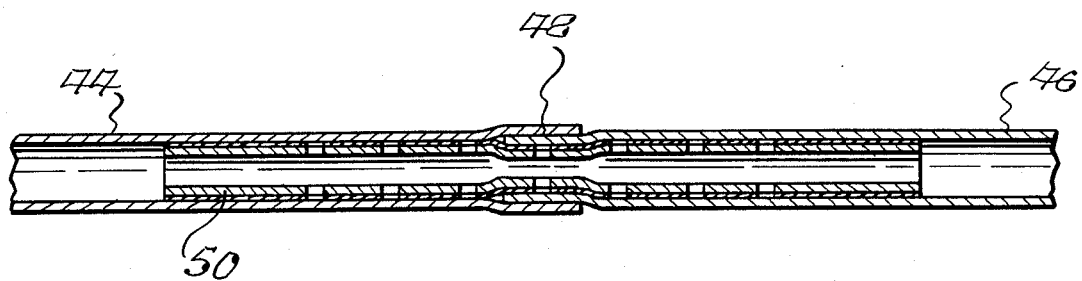
FIG. 8 is a longitudinal cross-sectional view of a telescoping joint bonded in the interior with the splicing tape.
Figure 9:
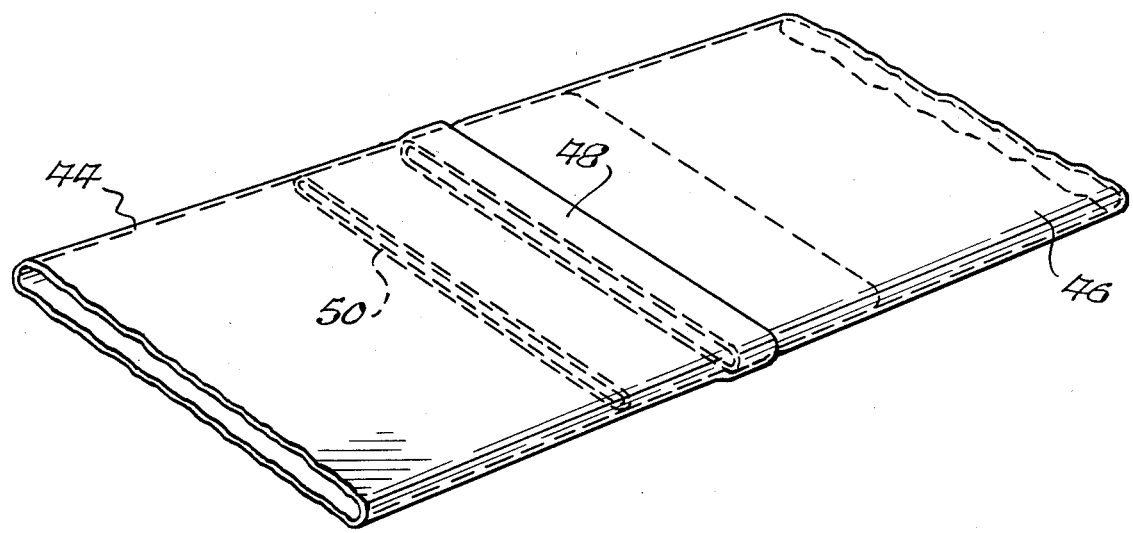
FIG. 9 is a perspective view of the fully bonded casing of FIG. 8.

Casings having inner saran coatings, like those available under the name "Faserin", a registered trademark of Teepak, Inc., Danville, Illinois, cannot be spliced together by heat sealing without a cellulose backing with or without a saran adhesive placed inside the joint. Accordingly, FIGS. 8 and 9 illustrate a further embodiment whereby food casing 46 having an inner saran coating is telescoped into casing 44, also having an inner saran coating, to form a joint 48 after a sleeve of splicing tape 50 is inserted into one end. The saran polymer of the splicing tape faces the inside wall of the casing so when heat sealed blockage at the joint will not occur. As a further, but less preferred embodiment, the splicing tape 50 need not have a saran coating when heat sealing such casings, but may be fabricated from only a cellulose backing material.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

What is claimed is:

1. A method of splicing premoisturized, ready-to-stuff tubular food casings, which comprises the steps of (a) assembling the trailing end of a moistened, ready-to-stuff first casing and the leading end of a moistened, ready-to-stuff second casing to form a joint, said ready-to-stuff casings having at leasat 20 percent by weight water based on total casing weight, (b) providing a splicing tape fabricated from a food film having a coating of a saran polymer, (c) wrapping the joint with the splicing tape, and (d) bonding the joint by compressing and heating the tape and moistened casing ends to a temperature sufficient to soften or melt the saran polymer without causing degradation.

2. The method of claim 1 wherein the saran is a homopolymer of vinylidene chloride.

3. the method of claim 1 wherein the spliced casings are gel type casings.

4. The method of claim 1 wherein the ends of the spliced casings are in abutting relation.

5. The method of claim 1 wherein one end of the spliced casing is telescoped into the other.

6. The method of claim 1 wherein a surface of each of the spliced tubular casings in contact with the splicing tape has a saran coating.

7. The method of claim 1 wherein the splicing tape is perforated.

8. The method of claim 7 wherein the ends of the spliced casings are in abutting relation.

9. The method of claim 7 wherein one of the spliced casings is telescoped inside the other.

10. the method of claim 7 wherein a surface of each of the spliced tubular casings in contact with the splicing tape is primed with an adhesion promoter.

11. The method of claim 10 wherein the adhesion promoter is a condensate of epichlorohydrin and a polysecondary amine.

12. The method of claim 10 wherein the saran coating is on an inside wall of the spliced casings.

13. The method of claim 10 wherein the saran coating is on the outside wall of the spliced casings.

14. The method of claim 7 wherein the splicing tape is prepared from a tubular food casing.

* * * * *